Oct. 30, 1962   KARL-HEINZ MENZEL ETAL   3,061,432
PYRAZOLINO BENZIMIDAZOLE COLOR COUPLER
Filed June 9, 1959
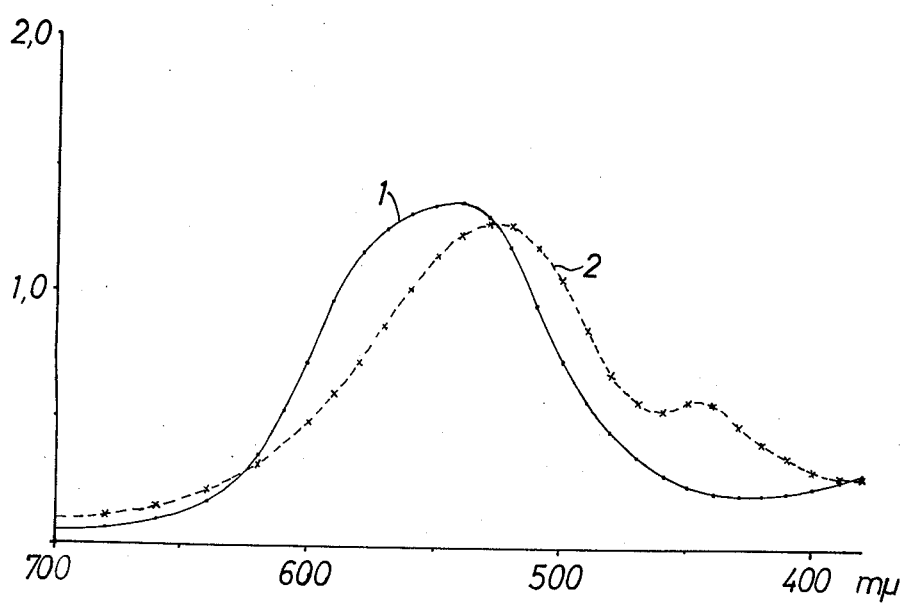
INVENTORS:
KARL-HEINZ MENZEL, OTTMAR WAHL, WILLIBALD PELZ.

3,061,432
PYRAZOLINO BENZIMIDAZOLE
COLOR COUPLER
Karl-Heinz Menzel, Koln-Mulheim, and Ottmar Wahl and Willibald Pelz, Opladen, Germany, assignors to Agfa Aktiengesellschaft, Leverkusen, Germany, a corporation of Germany
Filed June 9, 1959, Ser. No. 819,066
Claims priority, application Germany June 21, 1958
7 Claims. (Cl. 96—55)

The invention relates to pyrazolino-benzimidazole color couplers, a novel group of compounds, and to a process for the production of photographic color images, more especially photographic multi-color images by means of said compounds.

It is known that such color images are built up of three partial color images, the image dyes being so chosen that they have their main absorptions in the blue, green and red parts of the visible spectrum. The absorption of the partial image dyes should as far as possible be limited to the partial zones of the visible spectrum in which they have their main absorption and the side absorption of said dyes should be as low as possible. It is known to be particularly difficult to find suitable color couplers for the process of color forming development. This holds especially true for the color couplers which are transformed by the process of color forming development into magenta dyes. These magenta dyes should where possible only absorb in the green range of the spectrum, that is to say, they should have greatest possible permeability in the blue and red ranges of the spectrum.

It has now been found that the novel group of pyrazolino-benzimidazoles and their substitution products are especially suitable as color couplers for the process of color-forming development, especially for the production of magenta-colored images because of the desirable absorption properties of the dyes produced from said compounds by color development. These color couplers are 1,5-pyrazolino-benzimidazoles-(1'2') in which the carbon atom in 4-position is capable of reacting with the oxidation product of a primary aromatic amino developer to form a dyestuff.

Such compounds have the general formulae:

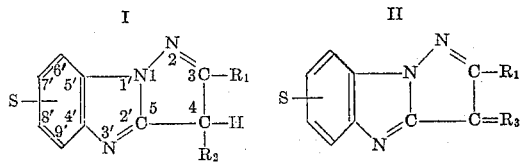

In these formulae:

$R_1$ represents a hydrogen atom or a monovalent organic radical, for example a saturated or unsaturated alkyl group having 1 to 20 carbon atoms (methyl, ethyl, propyl, butyl, decyl, dodecyl, heptadecyl, octadecyl); a cycloalkyl group (cyclohexyl); an aralkyl group (benzyl); an aryl group (phenyl, alkoxyphenyl in which the alkyl radical has 1 to 20 carbon atoms; nitrophenyl, aminophenyl, acylaminophenyl, alkylaminophenyl, naphthyl, diphenyl, diphenylether, diphenylthioether); a heterocyclic group ($\alpha$-furyl, $\alpha$-benzofuryl, $\gamma$-pyridyl); an amino, hydroxy or carboxylic acid group, it being possible for the hydrogen atoms of these groups to be substituted, for instance by a mono- or dialkylamino group in which the alkyl groups have 1 to 20 carbon atoms; a cycloalkylamino group; an amino group in which one hydrogen atom is replaced by a 1,5-pyrazolino-benzimidazole-(1',2')-radical, which is bonded in 3-position to said nitrogen atom, so that couplers result in which two 1,5-pyrazolino-benzimidazole-(1',2')-radicals are connected by an amino group, and in which the remaining hydrogen atom may be replaced by a substituent such as an alkyl-, aryl-, aralkyl-, acyl-radical; an acylamino group in which the acyl radical may be derived from an aliphatic, aromatic or heterocyclic carboxylic acid; a carboxylic acid group which is esterified by means of an aliphatic, cycloaliphatic, aromatic alcohol or by an aromatic compound having a phenolic hydroxy group; a carboxyamido group in which the amido group may be substituted for example by a saturated or unsaturated alkyl, aralkyl, aryl or heterocyclic group.

$R_2$ represents a hydrogen atom, a sulphonic acid or carboxylic acid group; a halogen atom (Cl, Br); or an azo radical —N=N—R, wherein R can be an aromatic or heterocyclic radical (phenyl, naphthyl, diphenyl, diphenylether, benzthiazolyl, pyridyl, guinolyl, pyrazolyl) which may be substituted such as by an alkyl group having 1 to 20 carbon atoms, hydroxy, alkoxy, halogen, amino, substituted amino, nitro, sulphonic acid or carboxylic acid groups.

$R_3$ represents a divalent radical

wherein $R_4$ can be alkyl, aralkyl, especially phenyl, phenyl substituted preferably in p-position by a tertiary amino group such as a dialkylamino group in which at least one on the alkyl groups may be substituted by carboxy, sulpho, hydroxy, alkoxy, carboxyl-alkyl, cyano or a divalent radical

wherein $R_6$ and $R_5$ represent aliphatic, aromatic, aralipathic or heterocyclic radicals;

S represents hydrogen or an alkyl, aralkyl, aryl, heterocyclic, alkoxy, hydroxyl, a substituted or unsubstituted amino radical, a halogen atom or carboxyl or sulphonic acid groups at different positions on the benzene ring.

In addition, one or more rings, especially benzene rings, can be fused linearly or angularly on the benzene ring.

In the color development with known color developers, more especially with p-phenylene diamine developers, these couplers form dyes which have very low side absorptions. Most of said dye-stuffs absorb in the green range of the spectrum and show a very low absorption in the red and blue ranges. They are consequently excellently suitable for the formation of brilliant and true-color positive multi-layer color images and are of great value for the formation of negative color images which serve as copying originals for the production of positive color images.

The dyes which are formed from the said color couplers by color development are not only distinguished by their good absorption, but have other advantageous properties, particularly by comparison with the dyes which are obtained from pyrazolone color couplers. Pyrazolone dyes are very unstable with respect to acids; with dilute mineral acids they change into the colorless form and are decomposed in an irreversible reaction. The dyes prepared from the couplers of the present invention are stable with respect to acids with which they only give a change in color tone, which change is reversible as the original color tone is again produced on neutralisation. The dyes of the present invention also show a relatively high stability on exposure, and the couplers themselves show a very slight tendency to yellowing in light.

Very many other pyrazolone dyes are reduced in the image layers, especially under the influence of moisture and heat, by the unreacted residual pyrazolone couplers. Due to a reduction of the magenta partial image in multi-layer color images, the phenomenon known as "greening" is produced. The images which are built up with the use of the present pyrazolino-benzimidazoles do not show this greening. All these properties have a very favourable action in practice as regards the durability of the color images.

The pyrazolinobenzimidazoles can be obtained from 1-(2'-aminoaryl)-pyrazolones by splitting off water in accordance with the following reaction diagram:

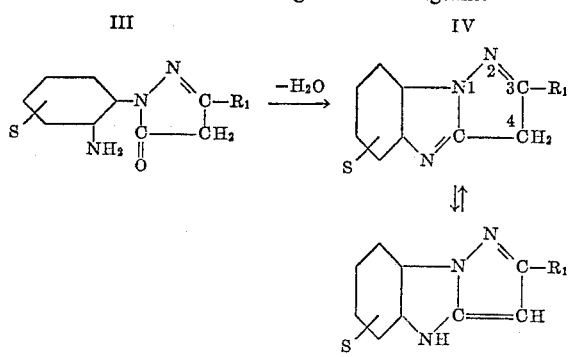

The production of 1-phenylpyrazolones, which carry an amino group in the phenyl nucleus in the o-position to the pyrazolone nitrogen, is described in our copending U.S. patent application Serial No. 773,564, filed November 13, 1958, and in Belgian Patent 572,971.

The splitting off of water and the ring formation can be obtained by treating the aforementioned pyrazolones with agents such as phosphoric acid or mineral acids which cause water to split off, or with aliphatic, araliphatic, aromatic amines or heterocyclic nitrogen bases at temperatures of about 100 to 200° C., also simply by heating in suitable solvents (chlorobenzene, dichlorobenzene), or by heating the pyrazolones per se at temperatures above their melting points, for instance at about 100 to 200° C.

Methods of preparation are set out by way of illustration in the examples following below.

The pyrazolino-benzimidazoles of the aforementioned general Formulae I and II with the substituent $R_2$ can be obtained from the compounds of Formula IV, for instance by reacting with concentrated sulphuric acid in order to introduce a sulphonic acid radical, by reacting with chloroformic acid ethyl ester in an alkaline medium (alcoholic, NaOH) at temperatures of 30 to 100° C. and if necessary subsequent saponification in order to introduce a carboxylic acid group, by reacting with bromine or sulphuryl chloride at room temperature in order to introduce a bromine or chlorine atom.

Generally speaking, the said couplers are colorless. Colored couplers are obtained if the radical $R_2$ is introduced as an azo radical —N=N—R, by coupling the compounds of Formula I with aromatic or heterocyclic diazonium compounds in an aqueous or alcoholic medium having a pH value of about 5 to 8, or if the radical $R_4$ is introduced by condensation with aromatic aldehydes in a weakly alkaline liquid (alcoholic) medium.

If the colored couplers are incorporated into a silver halide layer, they yield a colored negative image, for instance a magenta negative image, and a positive image of another color, after exposure and color development in an ordinary color forming developer, for instance a developer containing a primary aromatic amino group.

The present color couplers may be used in the color forming developing solution or they may be incorporated into a silver halide emulsion layer. In the latter case it is preferred to use about 3 to 20 g. of coupler per one kg. of silver halide emulsion, whereby the couplers are used in the form of their salts with alkali metals (Na, Li) or with ammonia or an amine when the couplers contain a solubilizing group ($SO_3H$, $COOH$). These couplers may contain alkyl groups having about 10–20 carbon atoms in order to make them resistant to diffusion. The couplers which have no solubilizing groups may also be dissolved in an organic solvent for the color coupler and dispersed in the gelatino-silver halide emulsion.

The color forming developers used in combination with the present couplers to produce dyestuff images are as such well known in the art. Of primary importance are derivatives of p-phenylenediamine in which one amino group is substituted by alkyl groups of which at least one may be substituted by a hydroxy, a carboxylic acid, sulphonic acid, a sulphonamide, or a NH—$SO_2$— alkyl group. Furthermore, these primary aromatic amine developers may be substituted in the position ortho to the primary amino group by a lower alkyl group, an alkoxy group, or a substituted or non-substituted amino group. Further suitable developers are derivatives of p-aminophenol.

In the accompanying drawing there are represented absorption curves 1 of a magenta dyestuff produced by the process illustrated by Example 2, and 2 of a dyestuff obtained in analogous manner while replacing the color couplers of Example 2 by 1-(3'-sulpho-4'-phenoxy-)phenyl-3-stearylpyrazolone-5. These curves clearly show that the slopes of the absorption curves of dyestuff 1 are steeper than those of dyestuff 2 and that the dyestuff 1 has a considerably smaller side absorption in the blue part of the spectrum.

Example 1

22 grams of 1-(o-aminophenyl)-3-carboxy-pyrazol-5-one are heated for 2 hours at 140° C. in 10.5 g. of aniline. The melt is stirred with acetone while still hot and filtered by suction to yield 9 g. of a compound having Formula 1 in the appended table.

This product couples to give a bluish-tinged magenta dye, when p-aminodiethylamine is used as color developer (compare Example 8).

Example 2

150 grams of 1-(o-amino-p-sulphophenyl)-3-heptadecyl pyrazol-5-one are heated for 2 hours at 140° C. with 31 g. of aniline. The melt is boiled with methanol and made acid with dilute hydrochloric acid. 108 g. of a coupler corresponding to Formula 2 are obtained. 1.5 g. of this coupler are suspended in 5 cc. of methanol, brought into solution with 5 cc. of 10 percent lithium hydroxide solution and 10 cc. of water, and made up with water to 100 cc. of solution. This solution is added to 100 g. of a silver halide emulsion, which is cast on a support in known manner as a photographic layer. After exposure and development with a p-phenylene diamine developer, a magenta image which has an absorption maximum at 540 mμ is obtained. Development may be carried through with the following solution: p-diethylamino aniline HCl 2 g., $Na_2SO_3$ 2 g., $Na_2CO_3$ 20 g., KBr 2 g., water to make 1 liter.

Example 3

78 grams of the compound of Formula 2 are introduced into 400 cc. of sulphuric acid and stirred for three hours. This is introduced into 1 litre of a mixture of ice and common salt solution, the sulphuration product precipitating, and 75 g. of the magenta coupler having Formula 3 are obtained.

1.5 grams of this coupler are suspended in 5 cc. of methanol and dissolved in 5 cc. of 10 percent caustic soda solution and 10 cc. of water. The solution is made up to 100 cc., and this is cast, exposed and developed as in Example 2, whereupon a magenta image which has an absorption maximum at 540 mμ is obtained.

Example 4

33 grams of 1-(o-amino-p-sulphophenyl)-3-phenylpyrazol-5-one are heated with 12 g. of m-toluidine for 2 to 3 hours at 160° C. The melt is stirred with acetone and 35 g. of color coupler having Formula 4 are obtained. When proceeding as in Example 8 this product couples with the color developer to form a bluish-tinged magenta dye.

Example 5

15 grams of 1-(o-aminophenyl)-3-phenylpyrazol-5-one are heated with 3 g. of aniline for 3 hours at 150° C. and the melt is stirred with acetone. 10 g. of product having Formula 5 are obtained from acetone-water and this product has a M.P. of 260° C.

When proceeding as in Example 8 the product couples with the color developer to form a bluish-tinged magenta dye.

Example 6

1.8 grams of 5-amino-2-hydroxy-4-methylbenzoic acid are dissolved in dilute hydrochloric acid and diazotized at 0 to 2° C. with 10 cc. of 10% sodium nitrite solution. The solution is made neutral with saturated sodium acetate solution and added to a solution of 4.5 g. of the product having Formula 2, in 10% lithium hydroxide. After heating for 10 minutes in a steam bath, there are obtained 4.5 g. of a yellow azo dye having Formula 6.

1.7 g. of this compound are dissolved as indicated in Example 3, and cast with a photographic emulsion on to a film or paper support. After exposure and development, a magenta image and a yellow image negative with respect thereto are obtained.

Example 7

4.75 grams of the product having Formula 2 and 2.75 g. of 4-dimethylaminobenzaldehyde are dissolved in alcohol, adjusted to a pH value of 9 with concentrated caustic soda solution and boiled for 3 hours. The solution is made neutral with hydrochloric acid and 5.5 g. of an orange-red dye having Formula 7 are obtained.

1.6 g. of this product are dissolved as indicated in Example 2, incorporated in a photographic emulsion and cast on a layer support. After exposure and development, a magenta image and an orange-colored image positive with respect thereto are obtained.

Example 8

A normal commercial photographic silver bromide paper is exposed behind an original and developed in a developer solution containing per litre:

2.75 g. of p-diethylaminoaniline hydrochloride
2 g. of anhydrous sodium sulphite
75 g. of anhydrous potassium carbonate
2.5 g. of potassium bromide
3.0 g. of the compound prepared according to Example 1.

The further processing is then in accordance with normal color development, i.e. the image is rinsed, bleached and fixed. A magenta-colored image is obtained.

Example 9

A color photographic negative film is built up in the usual manner by an acetyl cellulose support first having cast thereon a silver bromide emulsion with a cyan coupler incorporated in a diffusion-fast manner (for instance the sodium salt of 1-hydroxy-2-naphthoic acid-2'-N-methyl-N-octadecyl-5'-sulphonic acid-anilide), this being followed by a silver bromide emulsion with the compound mentioned in Example 2 as magenta component, after which a yellow filter layer is cast and on top of the latter a silver bromide emulsion layer with a yellow coupler (for instance the sodium salt of 4-stearoyl-aminobenzoyl-acet-3'-5'-dicarboxyanilide). The matching of the three emulsion layers is effected according to a known principle in such a way that after exposure of a stepped wedge with white light, the color development leads to a neutral grey negative stepped wedge.

The negative film is exposed to an object to be reproduced processed in ordinary processing baths including a developer solution containing a p-diethylamino aniline developer substance to produce a multi-color negative image, and thereafter printed on to a multi-color positive material, wherein after ordinary processing a positive image of very good color quality is obtained.

Example 10

9 grams of 1-(2'-amino-4'-sulpho-)phenyl-3-aminopyrazolone are heated up to 180° C. together with 5 g. of aniline and 1 g. of aniline hydrochloride for 1 hour and 50 minutes. About 5 g. of the product having Formula 8 is then recovered from the reaction mixture by crystallizing from methanol. Melting point 300° C. The product obtained couples with an oxidized color developer to form a magenta dyestuff. A magenta image was produced as described in Example 8.

Example 11

3 g. of 1 - (2'-amino-4'-chloro-)phenyl-3-carboxyl-pyrazolone-(5) are heated to 150° C. in 10 cc. of monoethylaniline for 8 hours. The product is precipitated with dilute hydrochloric acid. The product obtained, having Formula 9, couples with an oxidized color developer to form a blue dyestuff.

Example 12

5 grams of 1-(2'-amino-4'-bromo-)phenyl-3-carboxypyrazolone-(5) are heated to 150° C. in 5 cc. of monomethylaniline for 8 hours. The product having Formula 10 is isolated by addition of dilute hydrochloric acid. The product obtained forms a blue dyesuff with an oxidized color developer.

Example 13

2.5 g. of the product having Formula 8 dissolved in 10 cc. of pyridine are heated to 120° C. with 3 g. of stearoyl chloride for 10 hours. The product having Formula 11 precipitates on acidifying with dilute hydrochloric acid. After extraction with methanol about 3 g. of the above product are obtained. 1.5 g. of this product are dissolved according to the prescription given in Example 2, and incorporated into a photographic emulsion and cast on to a layer support. After exposing and developing, a magenta image having an absorption maximum of 535 mμ is obtained.

Example 14

6 g. of the product having Formula 1 dissolved in 20 cc. of petroleum ether are heated to 50° C. with 4.5 cc. of sulphuryl chloride for 2.5 hours. 6 g. of the product having Formula 12 are obtained. The product obtained forms a bluish-green dye when proceeding according to Example 8.

Example 15

16 g. of 1 - (2'-amino-4'-sulpho-)phenyl-3-heptadecen (8)yl-pyrazolone-5 are heated to 170° C. with 5 cc. of aniline for 2 hours. About 12 g. of the product having Formula 13 are precipitated with hydrochloric acid. 1.5 g. of this substance are dissolved following the prescription given in Example 2 and incorporated into a photographic emulsion. After casting onto a layer support, exposing and developing, a magenta image having an absorption maximum of 537 mμ is obtained.

TABLE OF FORMULAE (1) 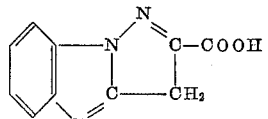

(2) 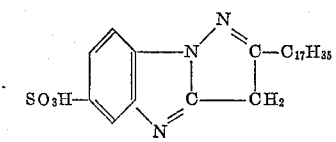

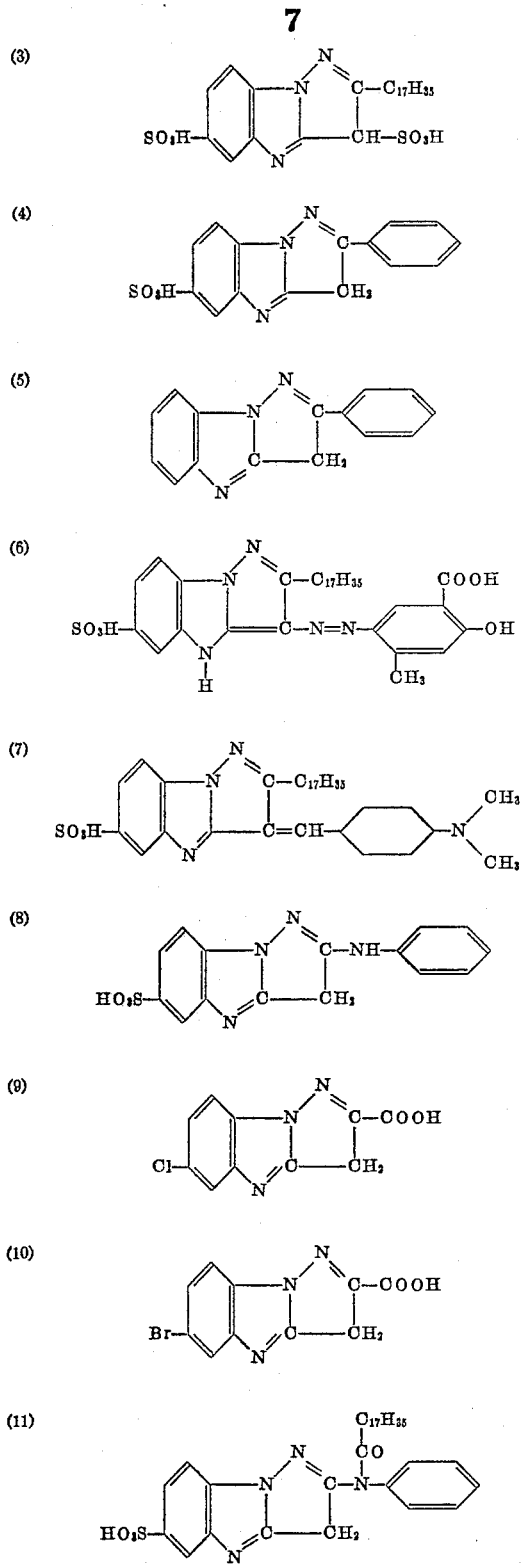

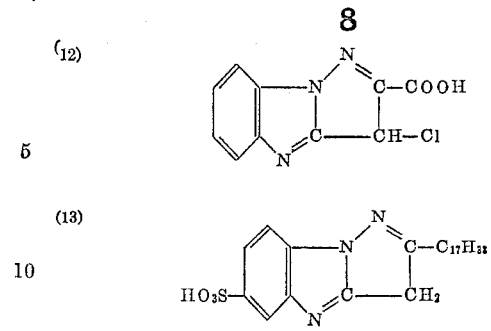

What we claim is:

1. A process for the production of color photographic images wherein an exposed silver halide emulsion layer is developed with a color-forming developer solution in the presence of a color coupler; said color coupler being a 1,5-pyrazolino-benzimidazole-(1',2') in which the carbon atom in the 4-position of the pyrazolino ring is capable of reacting with the oxidation product of a primary aromatic amino developer to form a dyestuff.

2. A light-sensitive emulsion layer containing as a color coupler a 1,5-pyrazolino-benzimidazole-(1',2') in which the carbon atom in the 4-position of the pyrazolino ring is capable of reacting with the oxidation product of a primary aromatic amino developer to form a dyestuff.

3. A 1,5-pyrazolino-benzimidazole-(1',2') in which the carbon atom in the 4-position of the pyrazolino ring is capable of reacting with the oxidation product of a primary aromatic amino developer to form a dyestuff.

4. A process of producing a 1,5-pyrazolino-benzimidazole-(1',2') which comprises subjecting a 1-(ortho-aminophenyl-)5-pyrazolone to conditions under which water is split off between the ortho-amine group and the keto-group of pyrazolone, and continuing this treatment until the starting pyrazolone is substantially completely converted to said pyrazolino-benzimidazole.

5. Process according to claim 4 wherein said 1-(ortho-aminophenyl-)5-pyrazolone is heated to temperatures of about 100 to 200° C. in the presence of a compound selected from the group consisting of phosphoric acid and an organic amine.

6. A process of producing derivatives of a 1,5-pyrazolino-benzimidazole-(1',2') which comprises reacting said pyrazolino-benzimidazole with about equimolar amounts of a coupling compound selected from the group consisting of diazonium salts and aldehydes to produce derivatives substituted in the 4-position by a group selected from the class consisting of an azo group and a methine group.

7. A process of producing derivatives of a 1,5-pyrazolino-benzimidazole-(1',2') which comprises reacting said pyrazolino-benzimidazole with concentrated sulphuric acid to introduce the sulphonic acid radical in the 4-position of said pyrazolino-benzimidazole.

References Cited in the file of this patent

FOREIGN PATENTS 572,971    Belgium _____ May 16, 1959

UNITED STATES PATENT OFFICE
CERTIFICATE OF CORRECTION

Patent No. 3,061,432                      October 30, 1962

Karl-Heinz Menzel et al.

It is hereby certified that error appears in the above numbered patent requiring correction and that the said Letters Patent should read as corrected below.

Column 1, lines 45 to 50, formula I, should appear as shown below instead of as in the patent:

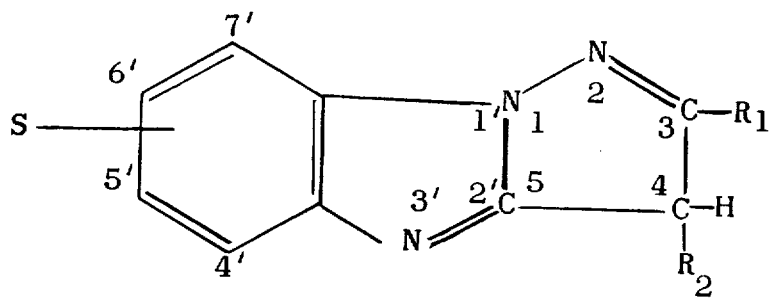

Signed and sealed this 23rd day of July 1963.

(SEAL)
Attest:
ERNEST W. SWIDER                        DAVID L. LADD
Attesting Officer                          Commissioner of Patents